(12) United States Patent
Waite

(10) Patent No.: US 11,349,332 B2  
(45) Date of Patent: May 31, 2022

(54) BATTERY ENERGY STORAGE SYSTEM

(71) Applicant: HONDA MOTOR CO., LTD., Tokyo (JP)

(72) Inventor: Matthew Gavin Waite, Wiltshire (GB)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/051,173

(22) PCT Filed: May 8, 2018

(86) PCT No.: PCT/JP2018/017786  
§ 371 (c)(1),  
(2) Date: Oct. 28, 2020

(87) PCT Pub. No.: WO2019/215817  
PCT Pub. Date: Nov. 14, 2019

(65) Prior Publication Data  
US 2021/0135484 A1    May 6, 2021

(51) Int. Cl.  
*H02J 7/00* (2006.01)  
*H02J 7/34* (2006.01)  
*H02J 3/32* (2006.01)  
*H01M 10/44* (2006.01)

(52) U.S. Cl.  
CPC ............ *H02J 7/345* (2013.01); *H01M 10/44* (2013.01); *H02J 3/322* (2020.01); *H01M 2220/20* (2013.01); *H02J 2207/20* (2020.01)

(58) Field of Classification Search  
CPC ........ H02J 7/345; H02J 2207/20; H02J 3/322; H01M 10/44; H01M 2220/20

USPC .......................................................... 320/166  
See application file for complete search history.

(56) References Cited

U.S. PATENT DOCUMENTS

| | | |
|---|---|---|
| 2009/0276172 A1 | 11/2009 | Nishi |
| 2016/0105044 A1* | 4/2016 | Yamaguchi ........... H02J 7/0013 320/112 |
| 2016/0362012 A1* | 12/2016 | Yao ...................... H02J 7/0013 |
| 2019/0126763 A1* | 5/2019 | Najmabadi ............. B60L 53/24 |

FOREIGN PATENT DOCUMENTS

| | | |
|---|---|---|
| JP | H0341594 A | 2/1991 |
| JP | 2000294298 A | 10/2000 |
| JP | 2005043059 A | 2/2005 |
| JP | 2008058278 A | 3/2008 |
| JP | 2009183086 A | 8/2009 |
| JP | 2015047026 A | 3/2015 |
| JP | 2016077139 A | 5/2016 |
| WO | 2005001401 A2 | 1/2005 |

* cited by examiner

*Primary Examiner* — Nathaniel R Pelton  
(74) *Attorney, Agent, or Firm* — CKC & Partners Co., LLC (57) ABSTRACT

A battery energy storage system is provided with: a charging/discharging control device capable of controlling charging/discharging of each of a plurality of electricity storage units in accordance with the supply and demand state of a power system; and a management device for adjusting the progression of deterioration of each of the electricity storage units by differentiating the charging/discharging amount of each of the electricity storage units and managing by differentiating the electricity storage units having a low degree of progression of deterioration from the electricity storage units having a high degree of progression deterioration.

8 Claims, 8 Drawing Sheets

BATTERY ENERGY STORAGE SYSTEM

TECHNICAL FIELD

The present invention relates to a battery energy storage system that is connected to an electric power system and adjusts a supply/demand state of the electric power system by charging/discharging a plurality of capacitors and/or batteries.

BACKGROUND ART

Up until now, for a battery energy storage system in which a plurality of capacitors and/or batteries also used in electric vehicles and the like are connected, there has been known a technology of controlling charge/discharge while utilizing the characteristics of each of the plurality of storage batteries. For example, Patent Literatures 1 to 3 each disclose this type of technology.

Patent Literature 1 relates to a power supply system which supplies power to an electric power system from a plurality of in-vehicle batteries. Patent Literature 2 relates to a power supply unit for multiple battery packs consisting of a plurality of battery packs connected in parallel or serial. Patent Literature 3 relates to a control device which controls charge/discharge of a plurality of storage batteries on the basis of storage battery type and information on a degree of degradation.

Patent Document 1: Japanese Unexamined Patent Application, Publication No. 2009-183086

Patent Document 2: Japanese Unexamined Patent Application, Publication No. 2000-294298

Patent Document 3: PCT International Publication No. WO2005/001401

DISCLOSURE OF THE INVENTION

Problems to be Solved by the Invention

Incidentally, because capacitors degrade with use, there are cases in which a capacitor must be replaced before the product to which the capacitor is mounted (for example, an electric vehicle) reaches the end of its life. However, when the capacitor is a dedicated capacitor for the product due to being an assembly or the like, it is difficult to acquire a replacement capacitor when production of the product ceases. Continuous production of replacement capacitors is also difficult because producing and storing capacitors incurs high costs.

It is an object of the present invention to provide a battery energy storage system that can manage a capacitor or a capacitor group that has different degrees of degradation advancement while providing ancillary services.

Means for Solving the Problems (1) The present invention is a battery energy storage system (for example, a battery energy storage system 1 to be described later), which is connected to an electric power system (for example, an electric power system 2 to be described later) and adjusts a supply/demand state of the electric power system by charging/discharging a plurality of capacitors (for example, an IPU 50 to be described later), the system including: a charge/discharge control unit (for example, a PLC 20 to be described later) that can control the charge/discharge of each of the plurality of capacitors or per capacitor group; and a management unit (for example, a system control unit 30 to be described later) which adjusts degradation advancement of each of the plurality of capacitors or the capacitor group by differing a charge/discharge amount of each of the plurality of capacitors or the capacitor group to distinguish between and manage a capacitor or capacitor group with a low degree of degradation advancement and a capacitor or capacitor group with a high degree of degradation advancement.

With this configuration, capacitors or a capacitor group that have different degrees of degradation advancement can be managed by controlling the degradation state of the capacitor while providing an ancillary service such as capacity for frequency control to the electric power system.

(2) In the battery energy storage system according to (1), the management unit sets a higher grade for each capacitor as the degree of degradation advancement decreases and, when a charge/discharge level required for charge/discharge control of the capacitors or the capacitor group is low, the capacitor that has a low grade is preferentially used, and when the charge/discharge level required for the charge/discharge control of the capacitors or the capacitor group is high, the capacitor that has a high grade is preferably used together with the capacitor that has a low grade.

With this configuration, the degree of degradation advancement of the capacitor can be managed while meeting the supply/demand state of the electric power system.

(3) In the battery energy storage system according to (1) or (2), a capacitor produced so as to be used in an electric vehicle (for example, an electric vehicle 100 to be described later) is preferably incorporated into at least some of the plurality of capacitors in an unused state.

With this configuration, the usage rate of capacitors in a new state can be reduced to perform the charge/discharge control, to thereby secure capacitors for the electric vehicle in a state of low degradation over a long period of time without separately storing the capacitor in a warehouse.

(4) In the battery energy storage system according to any one of (1) to (3), the capacitor mounted in an electric vehicle and in a used state can be newly incorporated as a control target of the charge/discharge control unit.

With this configuration, an ecocycle can be achieved in which the capacitor is reused.

(5) In the battery energy storage system according to any one of (1) to (4), the battery energy storage system preferably further includes a plurality of AC/DC converters (for example, a distributed AC/DC converter 201 to be described later) disposed for each of the plurality of capacitors or the capacitor group and connected to each of the plurality of capacitors or the capacitor group; and a single step-up/down transformer (for example, a step-up/down transformer 205 to be described later) to which the plurality of AC/DC converters are connected.

With this configuration, compared to a case in which the AC/DC converter is independently disposed, disposing the AC/DC converters for each of the capacitors or the capacitor group makes it possible to suppress loss throughout the whole system and perform boosting with the step-up/down transformer to effectively operate each of the AC/DC converters. With the ancillary service, since the charge/discharge amount normally required for the battery energy storage system is small in relation to the maximum charge/discharge amount, the battery energy storage system can be operated more effectively while achieving cost balance.

(6) In the battery energy storage system according to any one of (1) to (4), the battery energy storage system preferably further includes a plurality of AC/DC converters (for example, a distributed AC/DC converter 201 to be described later) disposed in and connected to each of the plurality of capacitors or the capacitor group; and a plurality of step-up/down transformers (for example, a distributed step-up/down transformer 206 to be described later) disposed for each of the plurality of AC/DC converters and connected to each of the plurality of AC/DC converters.

With this configuration, compared to a case in which the AC/DC converter is independently disposed, providing the AC/DC converters for each of the capacitors or the capacitor group makes it possible to suppress loss throughout the whole system and perform boosting with the step-up/down transformer disposed to each of the AC/DC converters to highly efficiently operate each of the AC/DC converters. With the ancillary service, since the charge/discharge amount normally required for the battery energy storage system is small in relation to the maximum charge/discharge amount, the battery energy storage system can be operated highly effectively.

(7) In the battery energy storage system according to any one of (1) to (6), the battery energy storage system preferably further includes a sales support unit that selects, when specified information for determining a degree of degradation is externally received, a capacitor among the plurality of capacitors that has a degree of degradation based on the specified information, and excludes that capacitor from control by the charge/discharge control unit to set the capacitor as a capacitor to be sold.

With this configuration, a capacitor that matches the request of a customer or the like can be selected from the capacitors or the capacitor group that have a managed degree of degradation advancement and be distributed on the market as a second-hand product.

(8) In the battery energy storage system according to (7), the sales support unit preferably sets a relatively high price when the capacitor that has a low degradation degree is designated based on the specified information and sets a relatively low price when a capacitor that has relatively advanced degradation is designated based on the specified information.

With this configuration, because the selling price is automatically set on the basis of the degree of degradation, sale of the capacitor can be carried out smoothly.

(9) In the battery energy storage system according to (7) or (8), the capacitor is a dedicated product for a predetermined electric vehicle, and the management unit sets the capacitor as a capacitor to be sold after receiving cease of production information on the electric vehicle.

With this configuration, the battery energy storage system can be used to secure a capacitor after sale of the electric vehicle has ceased, and management costs and $CO_2$ emissions can be reduced. Therefore, the capacitor can be supplied at an appropriate cost in response to a user request.

Effects of the Invention

With the battery energy storage system according to the present invention, a capacitor or a capacitor group that has different degrees of degradation advancement can be managed while providing ancillary services.

PREFERRED MODE FOR CARRYING OUT THE INVENTION

A preferred embodiment of the present invention is described below with reference to the drawings.

Figure 1:
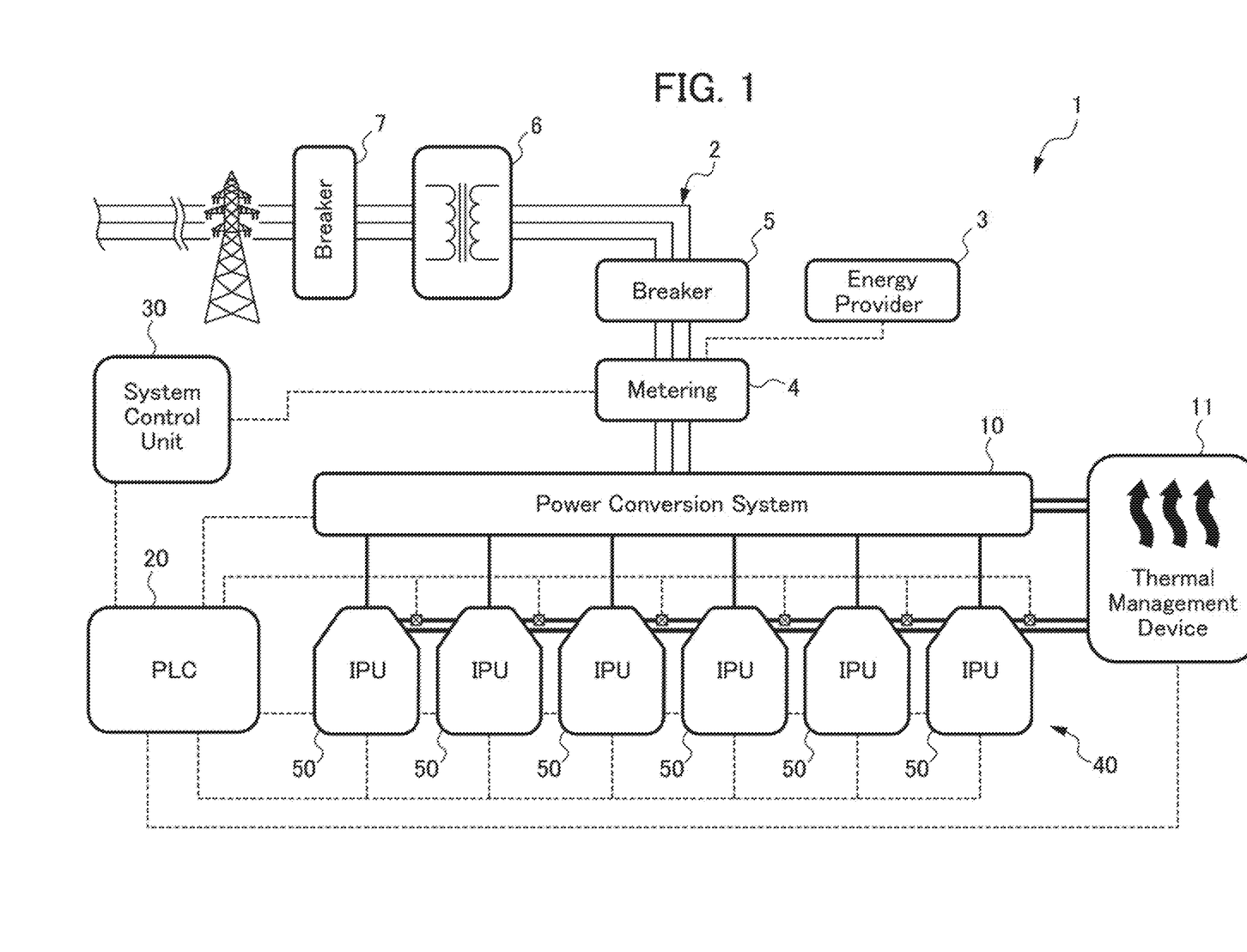
FIG. 1 is a diagram for illustrating a configuration of a battery energy storage system according to one embodiment of the present invention.

FIG. 1 is a diagram for illustrating a configuration of a battery energy storage system according to one embodiment of the present invention. The battery energy storage system (BESS) 1 illustrated in FIG. 1 provides ancillary services for stably operating an electric power system 2 to an energy provider 3. For example, frequency regulation for keeping system frequency of the electric power system 2 within a permissible range, spinning reserve of supplying power over a predetermined period of time when power is urgently needed in the electric power system 2 and the like are provided to the energy provider 3 as the ancillary services.

The electric power system 2 is supplied with power from thermal power stations, hydropower plants and nuclear power plants, as well as power generation facilities that use natural energy such as solar power plants and wind power plants. The battery energy storage system 1 is connected to the electric power system 2 that provides the ancillary services, and adjusts power output in response to a request for frequency regulation from the energy provider 3.

First, the overall configuration of the battery energy storage system 1 according to this embodiment is described. The battery energy storage system 1 according to this embodiment includes a plurality of intelligent power units (IPUs) 50, a power conversion system 10 to which the IPUs 50 are connected, a thermal management device 11, a PLC 20, and a system control unit 30. In addition, on the battery energy storage system 1 side of the electric power system 2, there is disposed a metering 4 that measures power, a breaker 5, a step-up/down transformer 6, a breaker 7 and the like.

The IPUs 50 used in the battery energy storage system 1 are produced by assembling batteries. In this embodiment, the IPUs 50 are produced as large-capacity storage batteries for a vehicle and are used by being integrated into the battery energy storage system 1. Among the plurality of IPUs 50, a predetermined percentage of IPUs 50 are incorporated into the battery energy storage system 1 in an unused state straight from the factory.

The power conversion system 10 is an AC-DC/DC-AC inverter. The IPUs 50 are charged/discharged via the power conversion system 10. The thermal management device 11 manages the temperatures of the IPUs 50 and the power conversion system 10. The PLC 20 controls the plurality of IPUs 50, the power conversion system 10, and the thermal management device 11. The PLC 20 controls the amount of energy in the power conversion system 10, the temperature, current and voltage of the IPUs 50, the amount of cooling medium that flows through the thermal management device 11, and other factors.

The system control unit 30 controls the PLC 20 in response to requests from the energy provider 3. In addition, the system control unit 30 manages the frequency of use of the IPUs 50, as well as the sale of IPUs 50 to be managed on the market.

Figure 2:
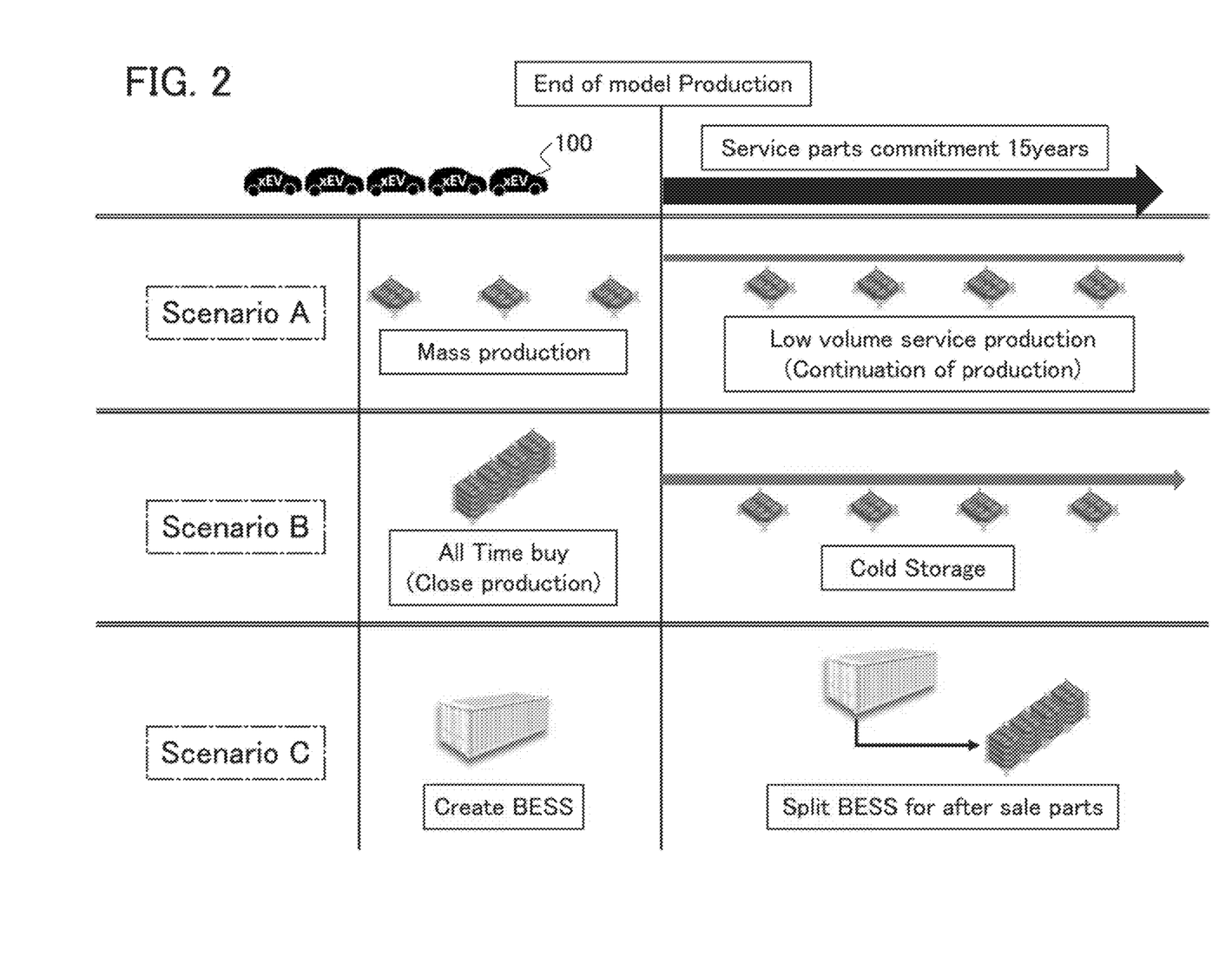
FIG. 2 is a diagram for describing a method of securing an IPU after production of an electric vehicle has ceased.

Next, the background behind selling the IPUs 50 using the battery energy storage system 1 according to this embodiment is described. FIG. 2 is a diagram for explaining a method of securing the IPUs 50 after production of an electric vehicle 100 has ceased.

The IPU 50 mounted to the electric vehicle 100 needs to be replaced due to usage or degradation over time. However, the IPU 50 is sometimes designed as a dedicated product depending on the model or year of the electric vehicle 100. Therefore, in order for the user to continue to drive the electric vehicle 100 even after production of the electric vehicle 100 has ceased, an IPU 50 for the electric vehicle 100 for which production has ceased must be secured. Next, a method conceived in order to secure a dedicated IPU 50 for the electric vehicle 100 after production of that electric vehicle 100 has ceased is described.

Scenario A in FIG. 2 is a method of securing a replacement IPU 50 by continuing production of the IPU 50 on a smaller scale even after production of the electric vehicle 100 has ceased. However, when the electric vehicle 100 was produced, the cost of the IPU 50 was low because the IPU 50 was mass-produced. Because this method involves producing the IPU 50 in small quantities, the cost of the IPU 50 greatly increases.

Scenario B in FIG. 2 is a method of storing the IPUs 50 that were mass-produced when the electric vehicle 100 was produced even though production of the IPUs 50 will cease along with the electric vehicle 100, and providing the IPU 50 in response to an offer to sell by a user. However, in order to avoid degradation of the IPUs 50 over time with this method, a large amount of IPUs 50 must be stored in a warehouse at the cool temperature, which incurs high costs. This method is also not favorable in terms of $CO_2$ reduction.

Scenario C in FIG. 2 is a method of securing the IPU 50 that solves the problems of costs and $CO_2$ reduction, and is a method of managing the IPUs 50 using the battery energy storage system 1 according to the present embodiment. In scenario C in FIG. 2, some of the produced IPUs 50 are incorporated into the battery energy storage system 1 and used while their degradation advancement is controlled. When a user requests an IPU 50, the IPU 50 is isolated from the battery energy storage system 1 and provided to the user.

Figure 3:
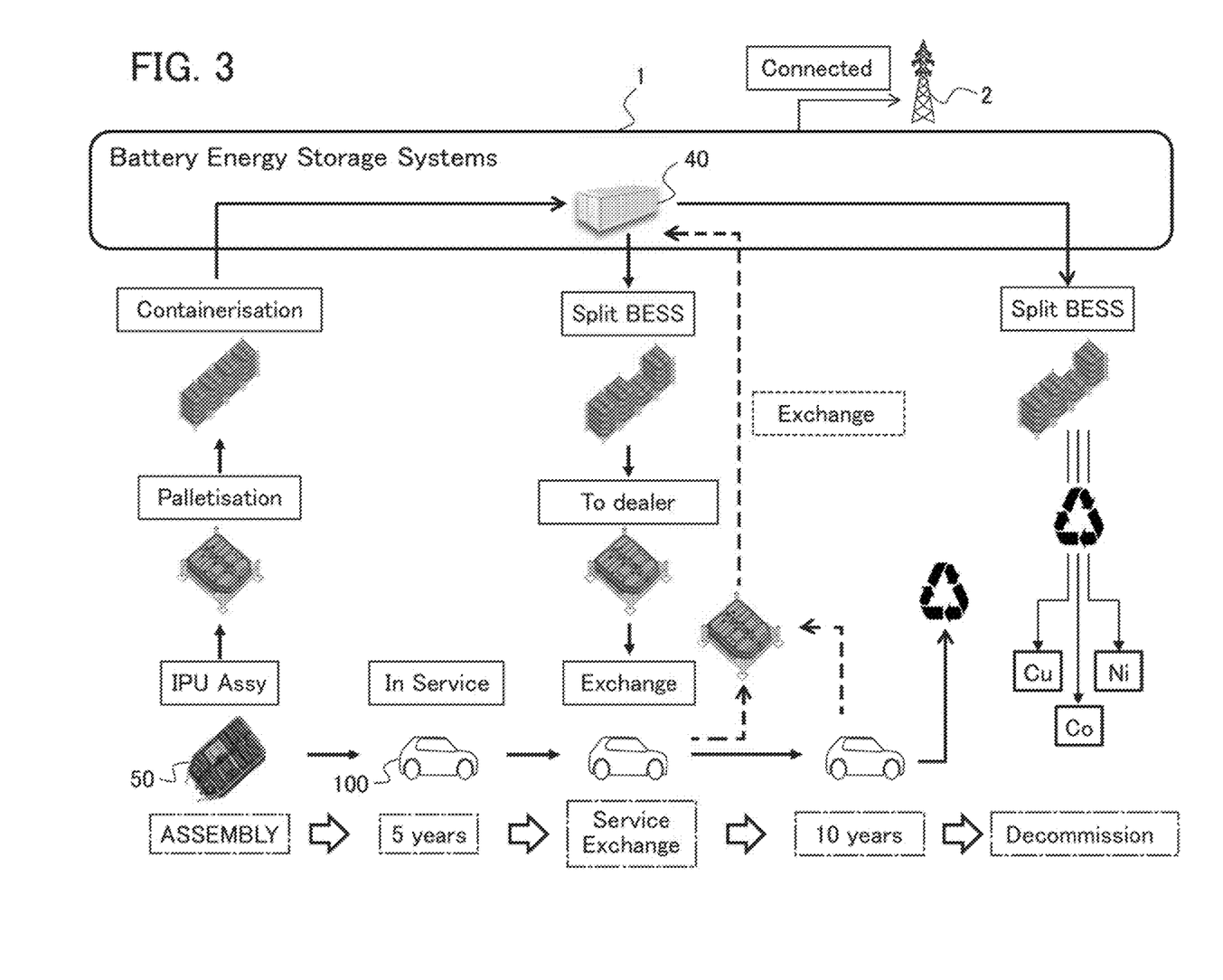
FIG. 3 is a diagram for describing sales management of the IPU using the battery energy storage system according to the embodiment.

Next, the sales cycle for IPUs 50 described in scenario C is described with reference to FIG. 3. FIG. 3 is a diagram for describing sales management of the IPUs 50 using the battery energy storage system 1 according to this embodiment. As illustrated on the left side of FIG. 3, some of the IPUs 50 that have been assembled at a factory are mounted to electric vehicles 100, and the remaining IPUs 50 are used in the battery energy storage system 1 without being mounted to the electric vehicle 100.

The IPUs 50 supplied to the battery energy storage system 1 are palletized to be shipped in pallets in an unused state and then containerized for container shipping and sent to the address of the battery energy storage system 1. The plurality of IPUs 50 (IPU group 40) sent to the battery energy storage system 1 are incorporated into the battery energy storage system 1 and used for the ancillary services such as charge/discharge for frequency regulation of the electric power system 2.

The battery energy storage system 1 according to this embodiment controls the degradation of the IPUs 50 while providing the ancillary services and provides a sales service for the IPUs 50. As illustrated in the middle of FIG. 3, when the user or a dealer requests sale of the IPU 50 to the battery energy storage system 1, the battery energy storage system 1 performs processing of isolating an IPU 50 that can be used in the electric vehicle 100 from the IPU group 40.

The second-hand IPU 50 that has been isolated from the battery energy storage system 1 is mounted to the electric vehicle 100 via the dealer or the like. The IPU 50 that was mounted to the electric vehicle 100 before this exchange is incorporated into the battery energy storage system 1 and reused if the IPU 50 has a degree of degradation that allows use by the battery energy storage system 1. In this case, as seen from the battery energy storage system 1 side, the exchange of the IPUs 50 is performed with the electric vehicle 100.

In FIG. 3, there is illustrated a state in which five years have passed since the IPU 50 of the electric vehicle 100 was exchanged by the battery energy storage system 1 and the electric vehicle 100 is recycled 10 years after production. Even in this case, the IPU 50 can be reincorporated into the battery energy storage system 1 if the IPU 50 has a degree of degradation that allows use by the battery energy storage system 1.

As illustrated on the right side of FIG. 3, when the degradation of the IPU 50 has reached a level that renders the IPU 50 unusable by the battery energy storage system 1, the battery energy storage system 1 isolates that IPU 50 from the IPU group 40. The degraded IPU 50 is subjected to recycling processing of recovering reusable materials such as metals Cu, Ni and Co.

Figure 4:
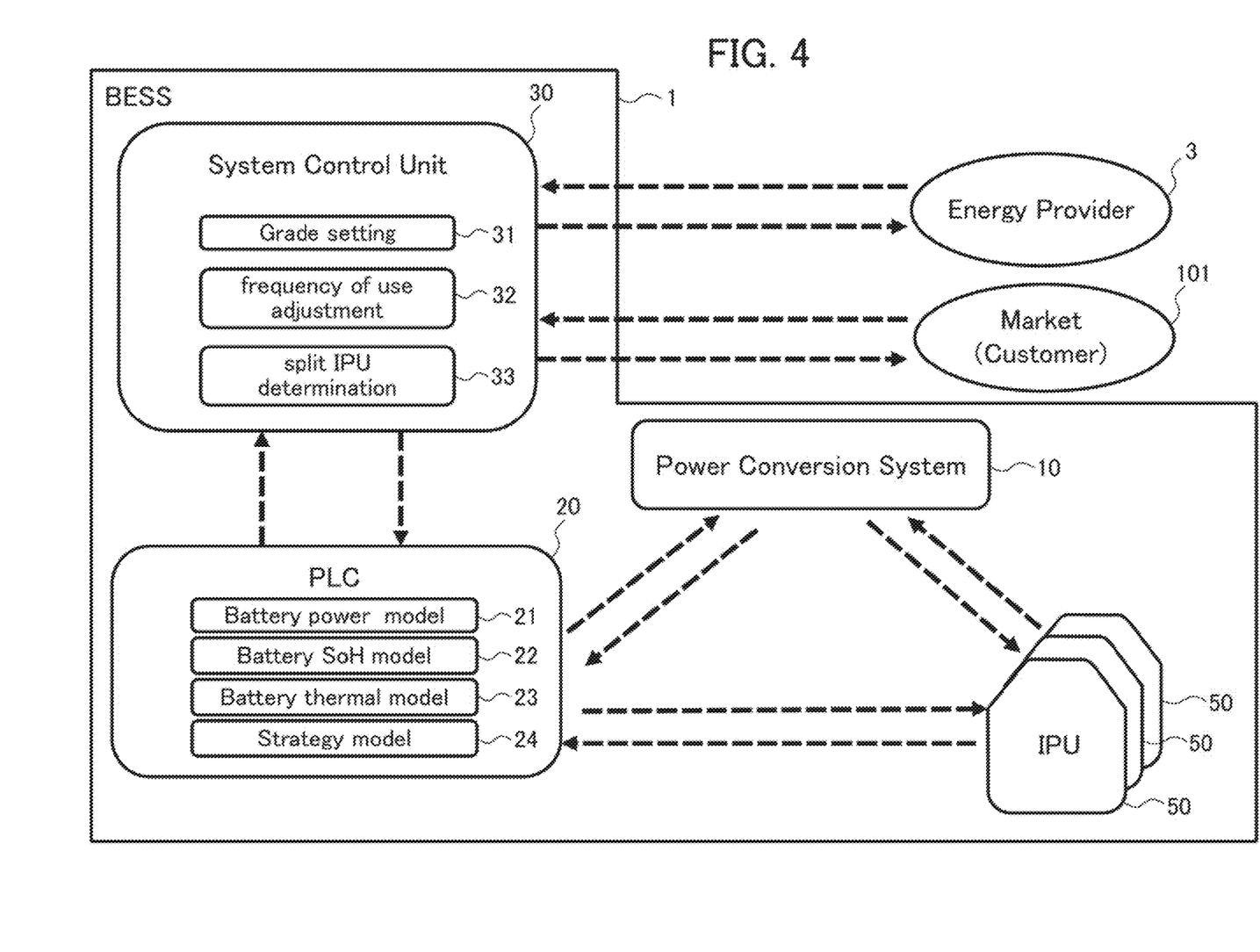
FIG. 4 is a block diagram for schematically illustrating a state in which the battery energy storage system according to the embodiment is connected to an energy provider and a market (customer) via communication.

Next, processing of degradation management and sale of the IPUs 50 using the battery energy storage system 1 is described. FIG. 4 is a block diagram for schematically illustrating a state in which the battery energy storage system 1 according to this embodiment is connected to the energy provider 3 and a market (customer) 101 via communication. As illustrated in FIG. 4, the battery energy storage system 1 is connected to an external energy provider and the market 101 via a communication network such as a leased line or the Internet or working autonomously to agreed standards. The market 101 is a component for schematically illustrating a system to which a computer used by a customer or a dealer who provides the IPU 50 to the customer is connected, or a computer used by the customer or the dealer.

First, processing that is performed while the ancillary services are provided by the battery energy storage system 1 is described. The energy provider 3 sends a response command to the battery energy storage system 1 on the basis of a supply/demand balance of the electric power system 2. For example, in order to keep set frequency of the electric power system 2 within a permissible range, the energy provider 3 sends a command requesting frequency regulation to the battery energy storage system 1. For example frequency control can be automatic at the BESS for high speed response.

When the system control unit 30 of the battery energy storage system 1 receives a command indicating a request for frequency regulation from the energy provider 3, the system control unit 30 sends a command for controlling charge/discharge of the IPUs 50 to the PLC 20 on the basis of that command.

The PLC 20 sends/receives various types of information to/from the IPU 50 via communication using a CAN protocol. For example, the PLC 20 requests an ID for identifying the IPU 50 from the IPU 50, and the IPU 50 sends various types of information such as ID information, a charge state (SoC), a degradation state (SoH), temperature and voltage to the PLC 20. CAN control could be excluded in some IPU types.

A battery power model 21, a battery SoH model 22, a battery thermal model 23, a strategy model 24 for performing optimization processing and other models are stored in the PLC 20. The PLC 20 performs, in real time, processing of using various types of information acquired from the IPU 50 and these models to perform charge/discharge, and the optimization processing for managing the degradation state. The power conversion system 10 controls charge/discharge of the IPUs 50 on the basis of the processing of optimizing the IPU 50 in real time by the PLC 20 and sends measurement information on electricity that flows through the electric power system 2 to the PLC 20.

The system control unit 30 according to this embodiment manages the degradation state of the IPUs 50 while controlling charge/discharge for providing the ancillary services. The system control unit 30 includes a grade setting unit 31 that can set a grade for each IPU 50 on the basis of differences in degree of degradation or sale price and other information, a frequency of use adjustment unit 32 which adjusts frequency of use of each IPU 50 on the basis of the grade, and a split IPU determination unit 33 that determines a specific IPU 50 to be isolated from the IPU group 40 of the battery energy storage system 1.

Figure 5:
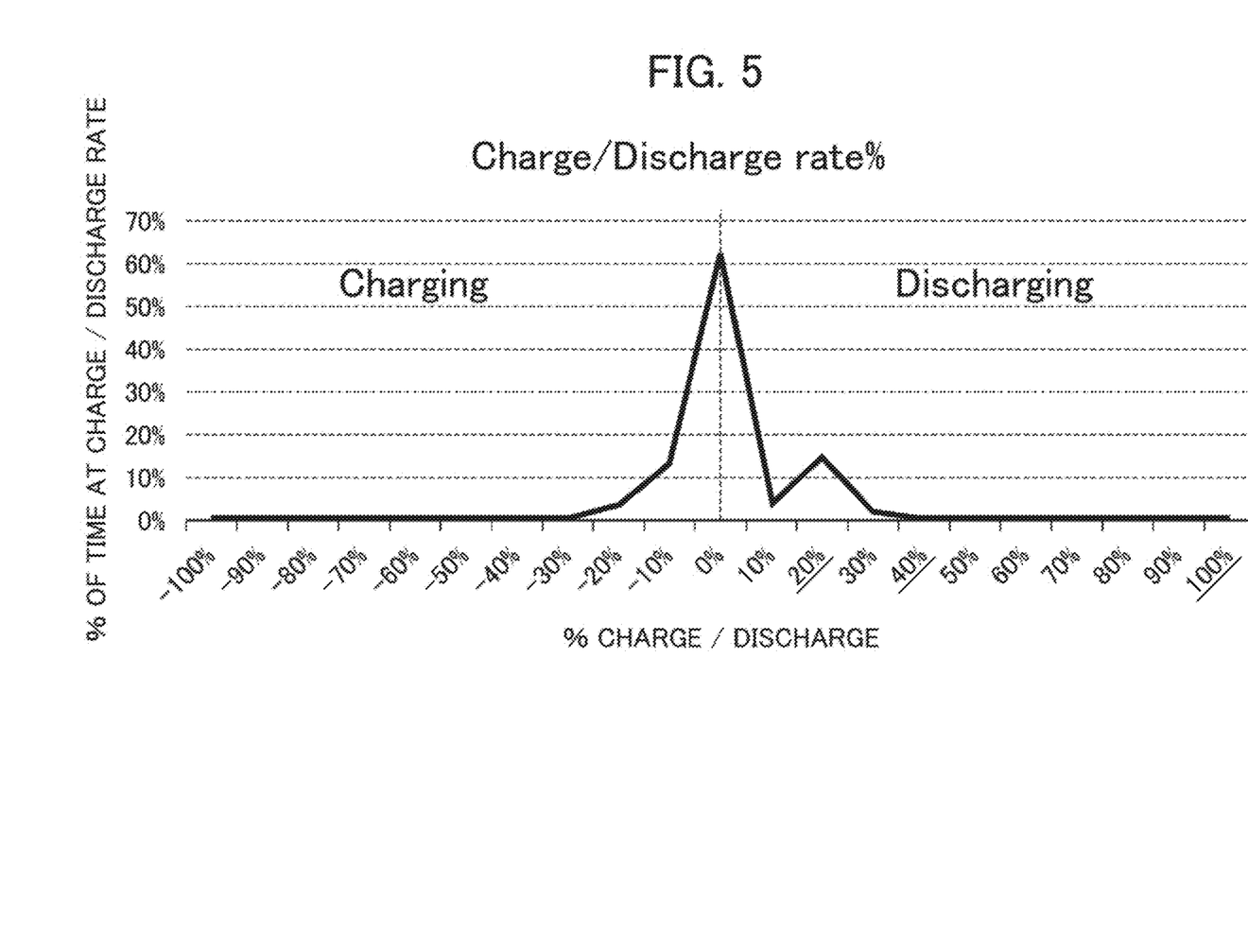
FIG. 5 is a graph for showing a usage rate of IPUs against charge and discharge required in the battery energy storage system according to the embodiment.
Figure 6:
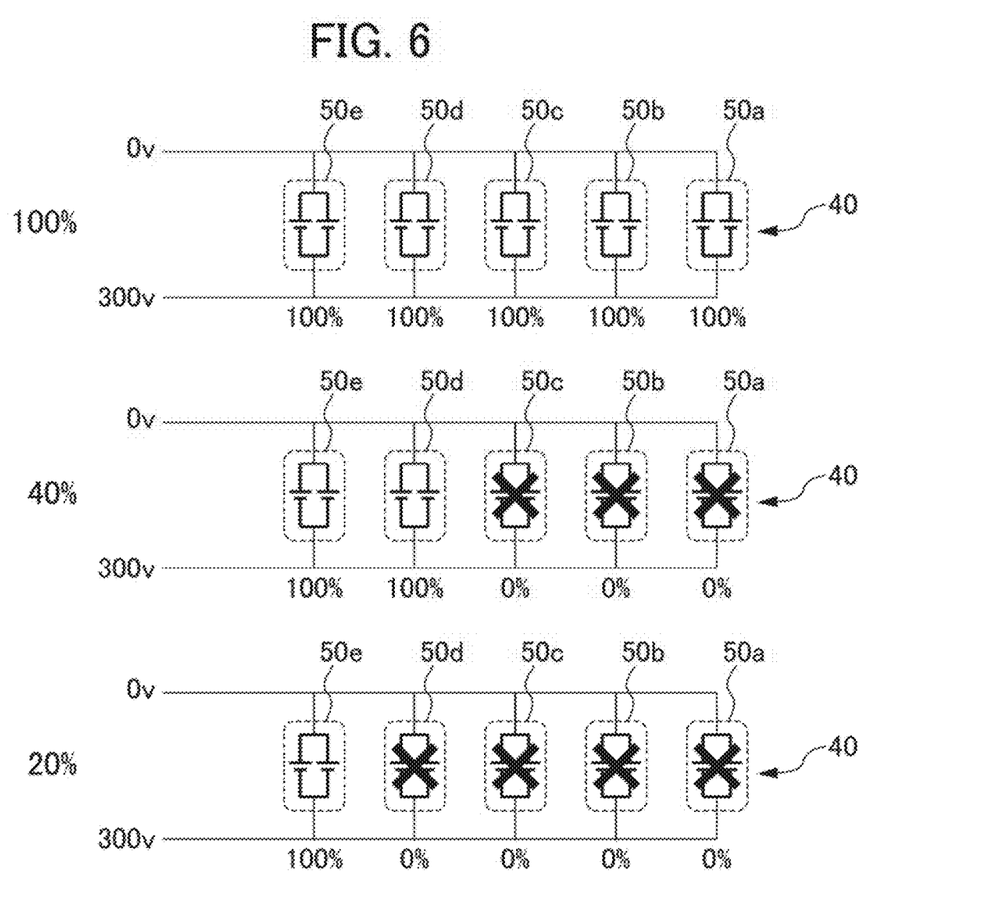
FIG. 6 is a diagram for schematically describing a state in which the battery energy storage system according to the embodiment is used to adjust frequency of use of IPUs on the basis of grades.
Figure 7:
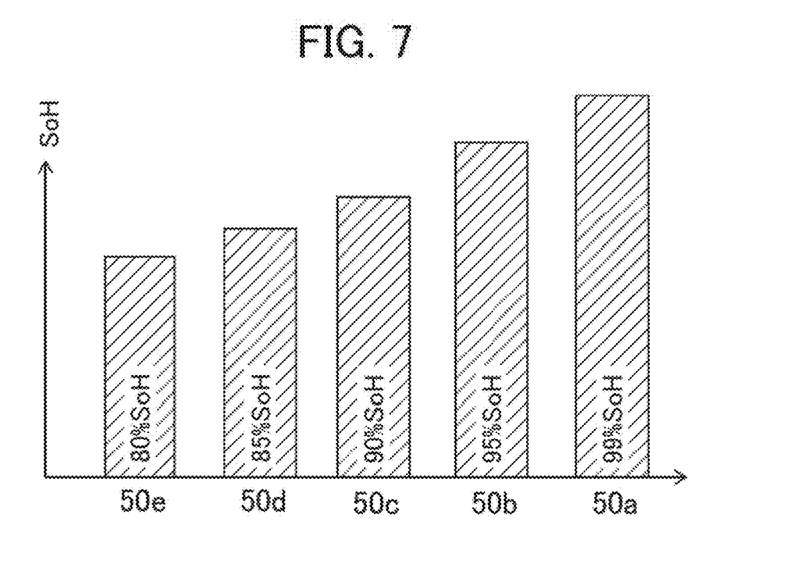
FIG. 7 is a graph for showing differences in degradation states of managed IPUs on the basis of grades using the battery energy storage system according to the embodiment.

Next, processing of adjusting the grade setting and the frequency of use is described with reference to FIGS. 5 to 7. FIG. 5 is a graph for showing a usage rate of IPUs 50 against charge and discharge required in the battery energy storage system 1 according to this embodiment. FIG. 6 is a diagram for schematically describing a state in which the battery energy storage system 1 according to this embodiment is used to adjust frequency of use of IPUs on the basis of grades. FIG. 7 is a graph for showing differences in degradation states of managed IPUs 50 on the basis of grades using the battery energy storage system 1 according to this embodiment. In FIGS. 6 and 7, a grade is set for each IPU 50 by the grade setting unit 31. A symbol 50a indicates the IPU 50 for which the highest grade is set. The grades decrease in the order of 50b, 50c and 50d, and 50e is the lowest set grade.

In the graph of FIG. 5, the horizontal axis indicates the usage rate of the IPUs 50 used on the basis of the charge or discharge rate required in accordance with the capacity of the battery energy storage system 1. Corresponding to the graph of FIG. 5, the upper row of FIG. 6 schematically illustrates a time when 100% of the capacity of the IPU group 40 (IPUs 50a to 50e) is used, the middle row schematically illustrates a time when 40% of the capacity of the IPU group 40 (IPUs 50a to 50e) is used, and the lower row schematically illustrates a time when 20% of the capacity of the IPU group 40 (IPUs 50a to 50e) is used.

When 100% of the capacity of the IPU group 40 is used, regardless of the set grade, all of the IPUs 50a to 50e are used for discharge. On the other hand, when 40% of the capacity of the IPU group 40 is used, 40% of the combined capacity of all of the IPUs 50a to 50e is required. Conventionally, each IPU 50a to 50e operates at 40% capacity, but in this embodiment, processing is performed in which IPUs 50 used in accordance with the grades are selected.

In this embodiment, the frequency of use adjustment unit 32 of the battery energy storage system 1 selects the IPU 50 to be used from among the IPU group 40. In an example in which 40% of the capacity of the IPU group 40 is used, only the IPU 50d and the IPU 50e that have low grades are selected as the IPUs 50 to be used, and the IPU 50a, IPU 50b and IPU 50c that have high grades are not used. Similarly, when 20% of the capacity of the IPU group 40 is used, only the IPU 50e that has the lowest grade is selected as the IPU 50 to be used.

As shown in the graph of FIG. 7, by adjusting the frequency of use, the frequency of use of the IPU 50a that has a high grade is lowered to slow the advancement of degradation, and the frequency of use of the IPU 50e that has a low grade increases to increase the advancement of degradation. In other words, in the same models, the IPU 50 that has a high grade does not degrade, and the IPU 50 that has a low grade does degrade.

Next, returning to FIG. 3, processing of selecting an IPU 50 to be sold in response to a request from the market 101 using the battery energy storage system 1 is described. When the customer or the dealer wishes to make a sale application for the IPU 50 to the battery energy storage system 1, sale application information is sent to the battery energy storage system 1 from the market 101. The sale application information can be sent via an exclusive market network or may be sent using a method in which the dealer or the customer directly communicates with the system control unit 30.

The sale application information includes specified information such as the above-mentioned grades, or a price, car model, or car year used to determine the grade. A method may be employed in which, after receiving the sale application information from the user or the dealer, processing of automatically inquiring after the grade or the specified information that determines the grade is performed to acquire the grade or the information for determining the grade.

The system control unit 30 selects the IPU 50 to be split by the split IPU determination unit 33 on the basis of the specified information in the sale application information and determines the selling price. For example, when the customer has requested an IPU 50 that has a high grade, the IPU 50a that has a high grade and has not degraded is selected from the IPU group 40, and the selling price is set on the basis of the grade and model of the IPU 50a. Because the IPU 50a has a high grade, a high selling price is set. Conversely, a low selling price is set for the IPU 50b with a low grade.

When information accepting the set selling price is received, a split command for the IPU 50 is sent to the PLC 20 and a related department, and processing of isolating the IPU 50a from the IPU group 40 is performed. As described above, the IPU 50a that has been isolated from the IPU group 40 is transferred to the end client via the dealer or the like. Further, when the user requires a medium grade, processing may be performed in which suggestion information for suggesting the IPUs 50b to 50d is sent and the split IPU determining unit 33 determines the grade on the basis of a response from the user.

A sales system for the IPU 50 using the battery energy storage system 1 has a configuration that accepts processing of a sales offer after production has ceased for the electric vehicle 100 to which the IPU 50 is to be mounted. In other words, the IPU 50 is mass-produced to accommodate parts replacement before production is ceased, and the IPUs 50 that were mass-produced before and after production of the electric vehicle 100 was ceased are incorporated into the battery energy storage system 1 after production has ceased, to thereby make it possible to provide the IPU 50 over a long period at low cost even after production of the electric vehicle 100 has ceased.

Figure 8:
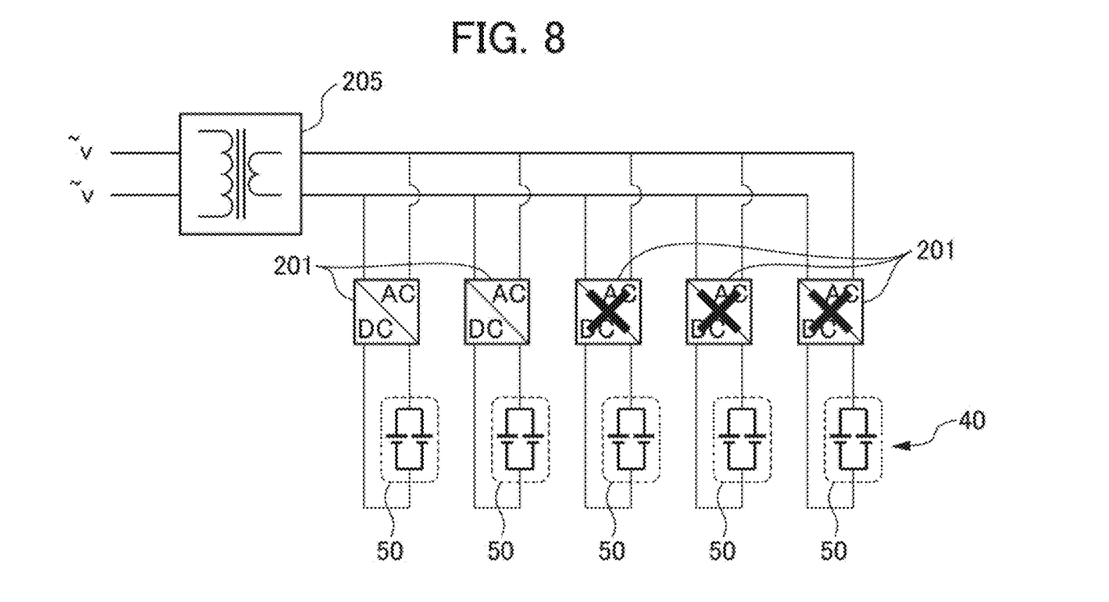
FIG. 8 is a diagram for describing an example in which distributed AC/DC converters are applied to the battery energy storage system according to the embodiment.

Next, a method of effectively operating the battery energy storage system 1 described in the above-described embodiment is described. FIG. 8 is a diagram for describing an example in which distributed AC/DC converters 201 are applied to the battery energy storage system 1 according to this embodiment. As illustrated in FIG. 8, a plurality of the distributed AC/DC converters 201 are disposed to correspond to the number of IPUs 50, and each IPU 50 is connected to an independent and dedicated distributed AC/DC converter 201. The plurality of distributed AC/DC converters 201 are connected to a common step-up/down transformer 205. According to this embodiment, even when the normal operating rate is from 20% to 40%, the battery energy storage system 1 can be operated at an operating rate of around 90% due to boost by the step-up/down transformer 205, and a highly efficient energy storage system can be achieved.

Figure 9:
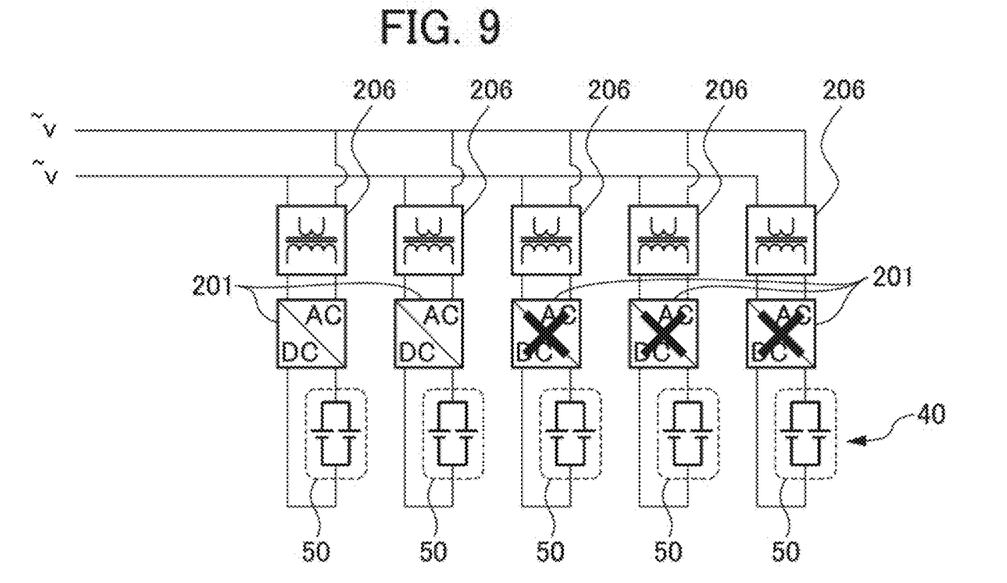
FIG. 9 is a diagram for describing an example in which distributed step-up/down transformers and the distributed AC/DC converters are applied to the battery energy storage system according to the embodiment.

FIG. 9 is a diagram for describing an example in which distributed step-up/down transformers 206 and the distributed AC/DC converters 202 are applied to the battery energy storage system 1 according to this embodiment. In FIG. 9, in addition to the configuration in FIG. 8, one step-up/down transformer 6 is also disposed for each IPU 50. With this configuration, while the configuration of the device increases, a further highly efficient operation state can be achieved.

According to the above-mentioned embodiment, the following effects are achieved.

(1) The battery energy storage system 1 according to this embodiment includes the PLC (charge/discharge control unit) 20 that can control the charge/discharge of each of the plurality of IPUs 50 (capacitors) in accordance with a supply/demand state of the electric power system 2; and the system control unit 30 (management unit) which adjusts degradation advancement of each IPU 50 by differing a charge/discharge amount of each IPU 50 to distinguish between and manage IPUs 50 with a low degree of degradation advancement and IPUs 50 with a high degree of degradation advancement. With this configuration, IPUs 50 that have different degrees of degradation advancement can be managed by controlling the degradation state of the IPUs 50 while providing ancillary services such as frequency adjustment to the electric power system 2.

(2) Further, in this embodiment, the system control unit 30 sets a higher grade for each IPU 50 the lower the degree of degradation advancement, preferentially uses the IPU 50*d* and 50*e* with a low grade when a charge/discharge level required for charge/discharge control of the IPUs 50 is low, and uses both the IPU 50*d* and 50*e* with a low grade and the IPUs 50*a* to 50*c* with a high grade when the charge/discharge level required for the charge/discharge control of the IPUs 50 is high. With this configuration, the degree of degradation advancement of the IPUs 50 can be managed while meeting the supply/demand state of the electric power system 2.

(3) Further, in this embodiment, at least some of the plurality of IPUs 50 produced for in-vehicle use in the electric vehicle 100 are incorporated in an unused state. With this configuration, the usage rate of IPUs 50 in a new state can be reduced to perform the charge/discharge control, to thereby secure IPUs 50 for the electric vehicle 100 in a state of low degradation over a long period of time without separately storing the capacitor in a warehouse.

(4) Further, in this embodiment, the IPU 50 mounted to an electric vehicle in a used state can be newly incorporated as a control target of the PLC 20. With this configuration, an ecocycle can be achieved in which the IPU 50 is reused.

(5) Further, the battery energy storage system 1 according to this embodiment may further include the plurality of distributed AC/DC converters 201 disposed for each IPU 50 and connected to each IPU 50; and a single step-up/down transformer to which the plurality of distributed AC/DC converters are connected. With this configuration, compared to a case in which an AC/DC converter is independently disposed, providing the distributed AC/DC converters 201 for each of the IPUs 50 makes it possible to suppress loss throughout the whole system and perform boosting with the step-up/down transformer to effectively operate each of the distributed AC/DC converters 201. With the ancillary service, since the charge/discharge amount normally required for the battery energy storage system is small in relation to the maximum charge/discharge amount, the battery energy storage system 1 can be operated more effectively while achieving cost balance.

(6) Further, the battery energy storage system 1 according to this embodiment may further include the plurality of distributed AC/DC converters 201 disposed for each IPU 50 and connected to each IPU 50; and the plurality of distributed step-up/down transformers 206 disposed for each of the plurality of distributed AC/DC converters 201 and connected to each of the plurality of distributed AC/DC converters 201. With this configuration, compared to a case in which an AC/DC converter is independently disposed, providing the distributed AC/DC converters 201 for each of the IPUs 50 makes it possible to suppress loss throughout the whole system and perform boosting with the distributed step-up/down transformers 206 disposed for each of the distributed AC/DC converters 201 to highly efficiently operate each of the AC/DC converters. With the ancillary service, since the charge/discharge amount normally required for the battery energy storage system is small in relation to the maximum charge/discharge amount, the battery energy storage system can be highly efficiently operated.

(7) Further, the system control unit 30 according to this embodiment also functions as a sales support unit which, when specified information for determining a degree of degradation is externally received from the external market 101, selects from among the plurality of IPUs 50 an IPU 50 that has an approximate degree of degradation based on the specified information, and excludes that IPU 50 from control by the PLC 20 to set the capacitor as a capacitor to be sold. With this configuration, the IPU 50 that matches the request of a customer or the like can be selected from the plurality of IPUs 50 that have a managed degree of degradation advancement and be distributed on the market as a second-hand product.

(8) Further, in this embodiment, the system control unit 30 sets a relatively high price when the IPU 50 that has a low degradation degree is designated based on the specified information and sets a relatively low price when the IPU 50 that has a relatively advanced degradation is designated based on the specified information. With this configuration, because the selling price is automatically set on the basis of the degree of degradation, sale of the IPU 50 can be carried out smoothly.

(9) In addition, in this embodiment, the IPU 50 is a dedicated component for a predetermined electric vehicle 100, and the system control unit 30 sets the IPU 50 as an IPU 50 to be sold after receiving cease of production information on the electric vehicle 100. With this configuration, the battery energy storage system 1 can be used to secure the IPU 50 after sale of the electric vehicle 100 has ceased, and management costs and $CO_2$ emissions can be reduced. Therefore, the IPU 50 can be supplied at an appropriate cost in response to a request from a user.

A preferred embodiment of the present invention has been described above, but the present invention is not limited to the above-described embodiment and may be changed as needed.

In the above-described embodiment, there is described the battery energy storage system 1 that controls the degree of degradation advancement with one IPU 50 as one unit, but the number of IPU 50s to be managed is not limited. For example, the same control applies to a case in which a plurality of IPU groups (capacitor groups) 40 are connected to the energy storage system 1 and the degree of degradation advancement is controlled for each IPU group 40. In other words, the IPUs 50 according to the above-described embodiment may be a group of a plurality of IPUs 50, and the IPU group 40 may be a group of the plurality of IPUs 50.

In the above-described embodiment, the battery energy storage system 1 is described as having a configuration in which the system control unit 30 also acts as the sales support unit, but the battery energy storage system 1 is not limited to this configuration. The sales support unit may be configured to be physically outside of the battery energy storage system via a communication network such as the Internet. For example, the market 101 illustrated in FIG. 4 may be the sales support unit. In this example, the market 101 is a server connected to a network. When the sale application information is received from the computer of the customer or the dealer, the market 101 communicates with the system control unit 30 to select the IPU 50 that has a degree of degradation that matches the needs of the customer on the basis of the specified information and sends suggestion information to the customer. The customer considers accepting or declining the purchase on the basis of the information suggested by the market 101.

The configuration relating to sales support can be omitted from the battery energy storage system 1 according to the above-described embodiment. For example, the battery energy storage system 1 may control the degree of degradation advancement of the IPU 50 while providing the ancillary services, while a person may select which IPU 50 to isolate from the battery energy storage system 1.

In the above-described embodiment, the IPU 50 for a vehicle to be used in the electric vehicle 100 is taken as an example, but the present invention is not limited to this configuration. For example, the present invention can also be applied to a portable capacitor or a capacitor installed in a building.

EXPLANATION OF REFERENCE NUMERALS

1 battery energy storage system
2 electric power system
20 PLC (charge/discharge control unit)
30 system control unit (management unit)
50 IPU (capacitor)

The invention claimed is:

1. A battery energy storage system, which is connected to an electric power system and adjusts a supply/demand state of the electric power system using charge/discharge of a plurality of capacitors, the system comprising:
   a charge/discharge control unit that can control the charge/discharge of each of the plurality of capacitors or a capacitor group in accordance with the supply/demand state of the electric power system; and
   a management unit that adjusts degradation advancement of each of the plurality of capacitors or the capacitor group by differing a charge/discharge amount of each of the capacitors or the capacitor group, to thereby distinguish between and manage the capacitors or the capacitor group with a low degree of degradation advancement and the capacitors or the capacitor group with a high degree of degradation advancement; and
   a sales support unit which selects, when specified information for determining a degree of degradation is externally received, a capacitor among the plurality of capacitors that has a degree of degradation based on the specified information, and excludes that capacitor from control by the charge/discharge control unit to set the capacitor as a capacitor to be sold,
   wherein the plurality of capacitors include capacitors produced for in-vehicle use in an electric vehicle.

2. The battery energy storage system according to claim 1, wherein:
   the management unit sets a higher grade for each of the plurality of capacitors as the degree of degradation advancement decreases,
   the management unit preferentially uses the capacitor that has a low grade when a charge/discharge level required for charge/discharge control of the plurality of capacitors or the capacitor group is low, and
   the management unit uses both the capacitor that has a low grade and the capacitor that has a high grade when the charge/discharge level required for the charge/discharge control of the plurality of capacitors or the capacitor group is high.

3. The battery energy storage system according to claim 1, wherein at least some of the plurality of capacitors are those produced for in-vehicle use in an electric vehicle and are incorporated into the battery energy storage system in an unused state.

4. The battery energy storage system according to claim 1, wherein a capacitor mounted to an electric vehicle in a used state can be newly incorporated as a control target of the charge/discharge control unit.

5. The battery energy storage system according to claim 1, further comprising:
   a plurality of AC/DC converters disposed for each of the plurality of capacitors or the capacitor group and connected to each of the plurality of capacitors or the capacitor group; and
   a single step-up/down transformer to which the plurality of AC/DC converters are connected.

6. The battery energy storage system according to claim 1, further comprising:
   a plurality of AC/DC converters disposed for each of the plurality of capacitors or the capacitor group and connected to each of the plurality of capacitors or the capacitor group; and
   a plurality of step-up/down transformers disposed for each of the plurality of AC/DC converters and connected to each of the plurality of AC/DC converters.

7. The battery energy storage system according to claim 1, wherein:
   the sales support unit sets a relatively high price when the capacitor that has a low degradation degree is designated based on the specified information, and
   the sales support unit sets a relatively low price when the capacitor that has a relatively advanced degradation is designated based on the specified information.

8. The battery energy storage system according to claim 1, wherein:
   the capacitor, is a dedicated capacitor for a predetermined electric vehicle, and
   the sales support unit sets the capacitor as a capacitor to be sold after receiving cease of production information on the electric vehicle.

* * * * *